United States Patent [19]

Chieh

[11] Patent Number: 5,406,338
[45] Date of Patent: Apr. 11, 1995

[54] STRUCTURE FOR NOSE PIECES OF SPECTACLES

[76] Inventor: Chen M. Chieh, No.5, Aly 12, Lane 56, Chung Cheng Rd., Hsin-Chuang City, Taipei County, Taiwan, Prov. of China

[21] Appl. No.: 261,416

[22] Filed: Jun. 17, 1994

[51] Int. Cl.$^6$ .............................................. G02C 5/12
[52] U.S. Cl. ..................................... 351/136; 351/137
[58] Field of Search ................. 351/136, 137, 138, 76, 351/77, 78, 140

[56] References Cited

U.S. PATENT DOCUMENTS 4,556,300  12/1985  Dietrich ............................... 351/136
4,792,222  12/1988  Labenz et al. ....................... 351/136

Primary Examiner—William L. Sikes
Assistant Examiner—Huy Mai
Attorney, Agent, or Firm—W. Wayne Liauh

[57] ABSTRACT

An improved structure for nose pieces of spectacles includes two nose pieces made of soft plastic with concave surface which is planted with fine down and formed with a plurality of air permeable holes therein. A connecting axle is integrately formed on the rear surface of nose piece and extended into a base. A protruding ball is formed at one end of the connecting axle and is held in the base. The protruding ball has a flat top surface to contact with a spectacle seat and has a concave bottom surface to match a pressing detent below. A torsional spring is disposed in the base along with pressing detent. A latching axle is used to hold the base, pressing detent and torsional spring together.

5 Claims, 6 Drawing Sheets

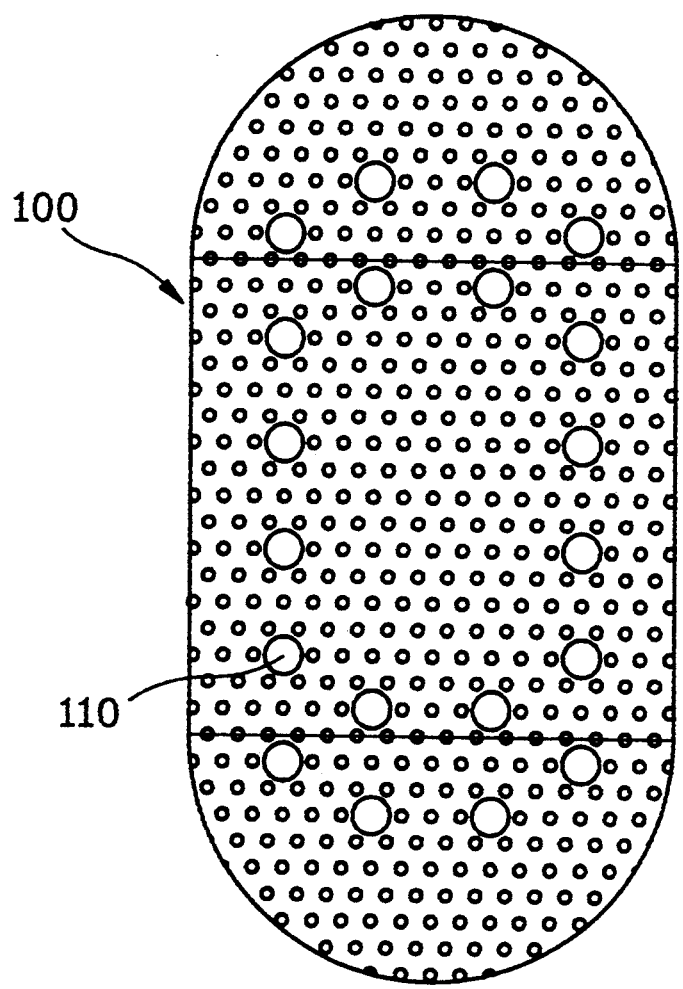
F I G. 2

A—A

STRUCTURE FOR NOSE PIECES OF SPECTACLES

BACKGROUND OF THE INVENTION

The inventor of the present invention has previously submitted an improved structure for nose pieces of spectacles with patent application Ser. No. 08/072,280 (referring to FIG. 7). That invention comprises nose piece 10, base 20, pressing detent 30, torsional spring 40 and latching axle 50. There are some shortcomings and deficiency found in that invention, notably:

1. Protruding ball 13 on connecting axle 12 is disposed below spectacles seat 70 which has flat surface at the contact of protruding ball 13. The small contact spot between protruding ball 13 and seat 70 tends to make nose piece 10 swing or rock easily. Wearer has to adjust nose piece 10 frequently to get the right angle and position to fit wearer's face profile and nose bridge.
2. Base 20 has a hole 22 and an opening 24 formed on a side wall which substantially reduce the structural strength of base 20. Not proper assembly or use could easily deform base 20 and impact the function of the whole assembly.
3. Pressing detent 30 has two holes 32, 33 formed respectively on the left and the right sidewalls to engage with torsional spring 40. It takes precise machining to align holes 32 and 33 on same axis and to hold other components together. Deviation of alignment of holes 32 and 33 would make assembly work difficult or impact proper function when assembly completed.
4. Latching axle 50 is disposed with an annular groove 51 and an E shape buckle 60 at one end. It needs precise machining to fit together. Assembly is also difficult.

Thus there has been found a further need for improvements to make the invention more practical.

SUMMARY OF THE INVENTION

It is accordingly an object of the present invention to provide furthe structural improvements on spectacles nose pieces that can be easily adjusted and reliable to use and can suit different wearer's particular requirements.

The present invention particularly contemplates to use a soft plastic to form spectacles nose pieces, and to dispose fine down on its surface and to dispose a plurality of through holes therein for air permeation purpose.

The present invention also contemplates to employ a connecting axle with a protruding ball which has flat top surface and a concave bottom surface to increase the stability and to facilitate the assembly.

The present invention further contemplates to provide a spectacles nose piece that is rugged in structure and simple in assembly.

Additional objects and advantages of the present invention are made apparent in the following description having reference to the accompanying drawings.

BRIEF DESCRIPTION OF THE DRAWINGS

FIG. 2 is a fragmentary plan view of a nose piece of the present invention.

DESCRIPTION OF THE PREFERRED EMBODIMENT

Figure 1:
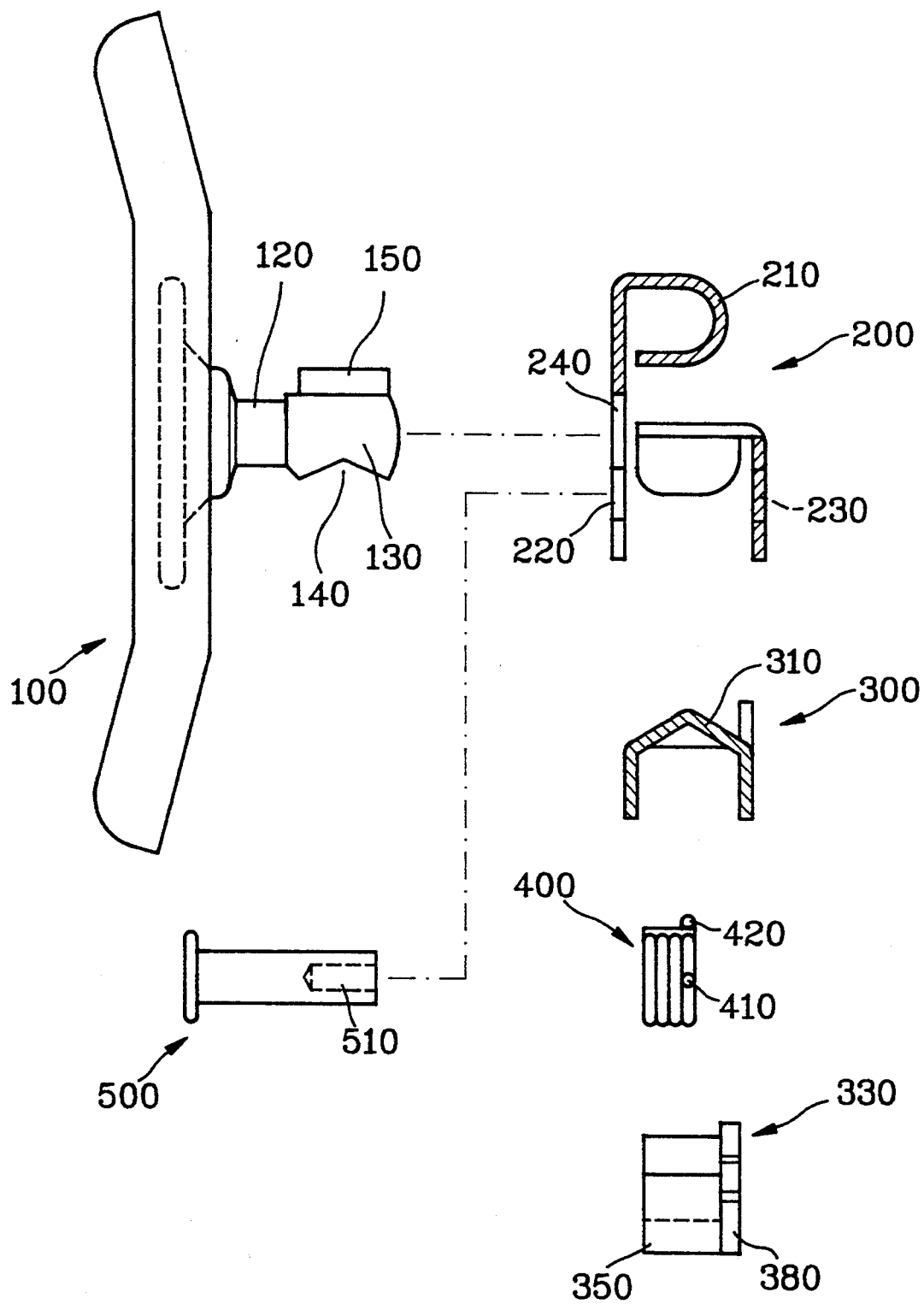
FIG. 1 is a breakup view of the present invention.

Referring to FIG. 1, the present invention includes major components of nose piece 100, base 200, pressing detent 300, pressing detent cover 330, torsional spring 400, latching axle 500. Also referring to FIG. 2, nose piece 100 is made by soft plastic material and has an oval shape and a front concave surface. The concave surface is planted with fine down or covered by fine cloth. Nose piece 100 is disposed with a plurality of air permeable through holes 110. A connecting axle 120 is integrately disposed on the rear surface of nose piece. A protruding ball 130 is formed at one end of connecting axle 120. Protruding ball 130 has a concave bottom surface 140 and a flat top surface 150.

Referring to FIG.3, 4, 5 and 6A, base 200 has a protruded P shape head 210 engaging with a spectacles seat 700, and forms a n shape crosssection in the lower section. Two holes 220 and 230 are formed respectively on the left and the right sidewalls of the lower section and have a common axis. Another opening 240 is formed on the left sidewall of the lower section.

Figure 6A:
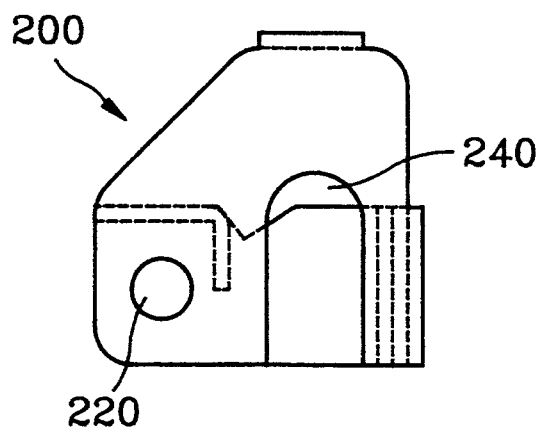
FIG. 6A is a plan view of a base of the present invention.
Figure 6B:
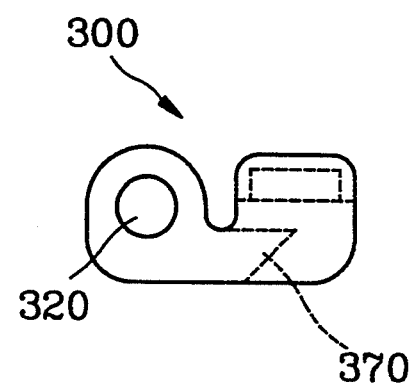
FIG. 6B is a plan view of a pressing detent of the present invention.

Also referring to FIG. 6B, pressing detent 300 has a top pressing arm 310 matching with the concave bottom surface 140 of protruding ball 130, and has a hole 320 formed on a front wall, and has a concave latch opening 370 formed on a rear wall.

Figure 6C:
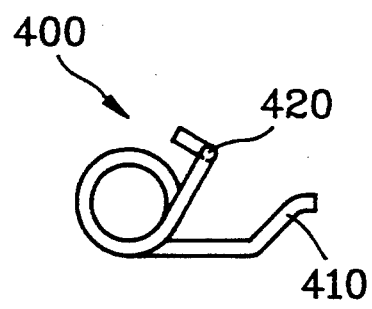
FIG. 6C is a plan view of a torsional spring of the present invention.
Figure 6D:
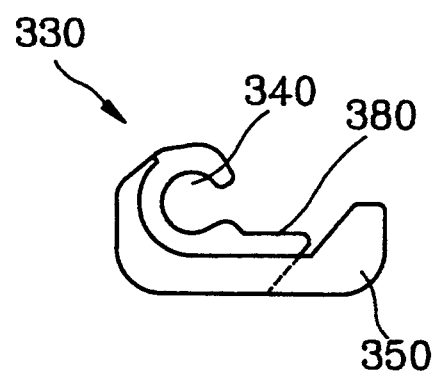
FIG. 6D is a plan view of a pressing detent cover of the present invention.

Also referring to FIG. 6D, pressing detect cover 330 has a J shape rear wall 350, a protrudent latching flange 380 is formed to engage with latch opening 370 on pressing detent 300. An opening 340 is formed at another end.

Also referring to FIG. 6C, torsional spring 400 is disposed inside of base 200, has two spring legs 410 and 420 to maintain a pre-set tension.

Latching axle 500 has a hollow end 510 and run through holes 220 and 230 of base 200.

Figure 4:
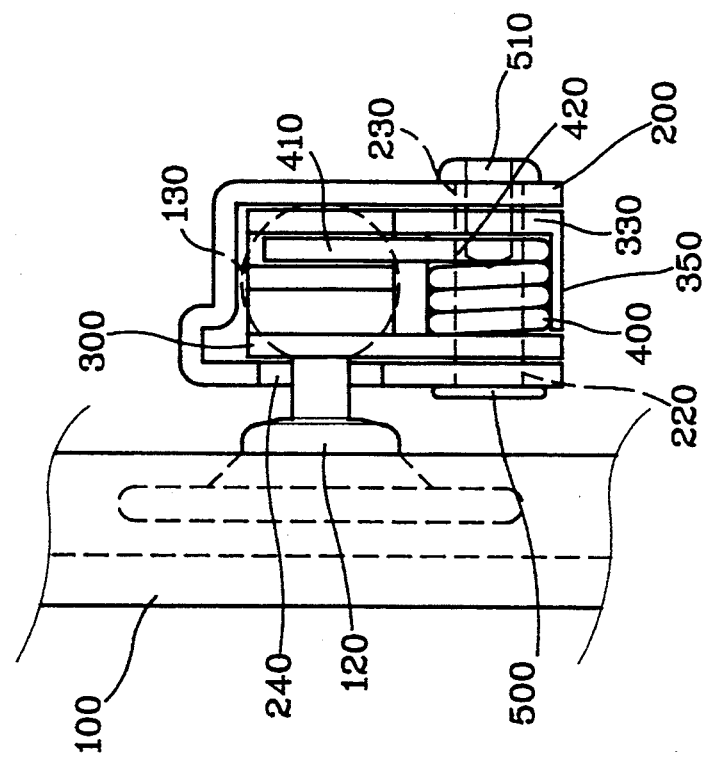
FIG. 4 is a top view of the present invention.
Figure 3:
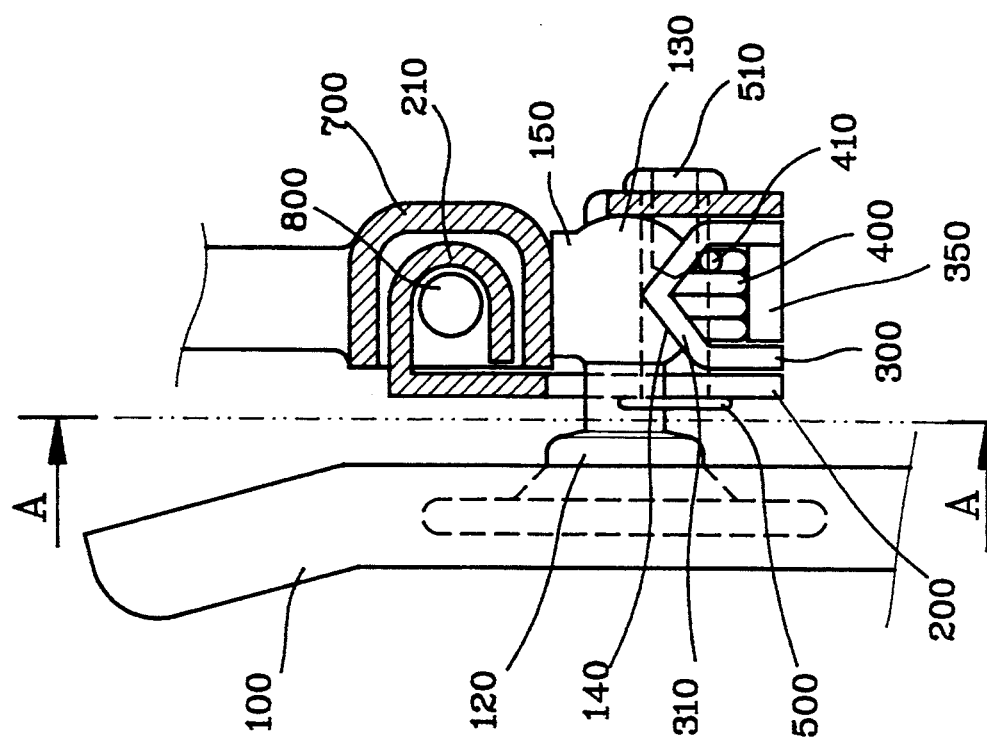
FIG. 3 is a side view of the present invention with a fragmentary cutaway section view of a spectacles seat.
Figure 5:
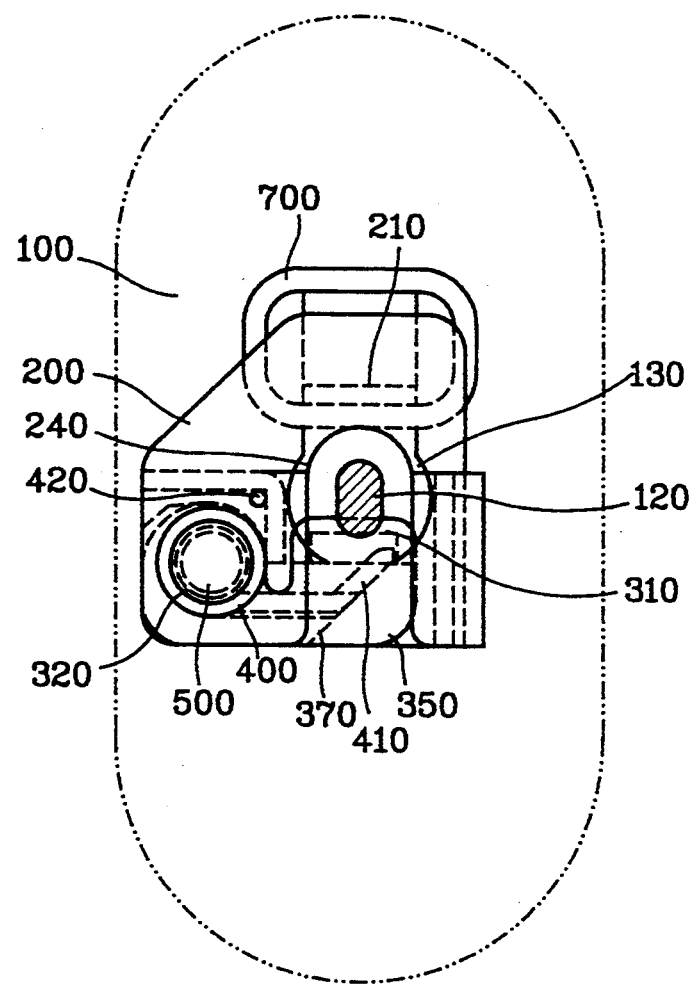
FIG. 5 is a plan view of the present invention taken in section along section line A—A of FIG. 3.

Referring to FIG. 3, 4 and 5 for the assembly and structure of the present invention, torsional spring 400 is disposed in front of hole 320 of pressing detent 300, then pressing detent and torsional spring is disposed together in base 200, Holes 220, 320, and torsional spring 400 are aligned in the same axis and with latching axle 500 ran through them. Latching axle 500 has its hollow end 510 stamped flat to engage firmly with base 200. Connecting axle 120 and protruding ball 130 run through opening 240 and is disposed in base 200, and having flat top surface 150 disposed below spectacles seat 700, and concave surface 140 matched with top pressing arm 310. Pressing detent cover 330 is then disposed between pressing detent 300 and base 200 with opening 340 engaging with latching axle 500. Thus complete the assembly of a spectacle nose piece of the present invention.

The nose piece assembly then can be installed in the spectacles by disposing P shape head 210 of base 200 in seat 700 and fixed by a screw 800.

Figure 7:
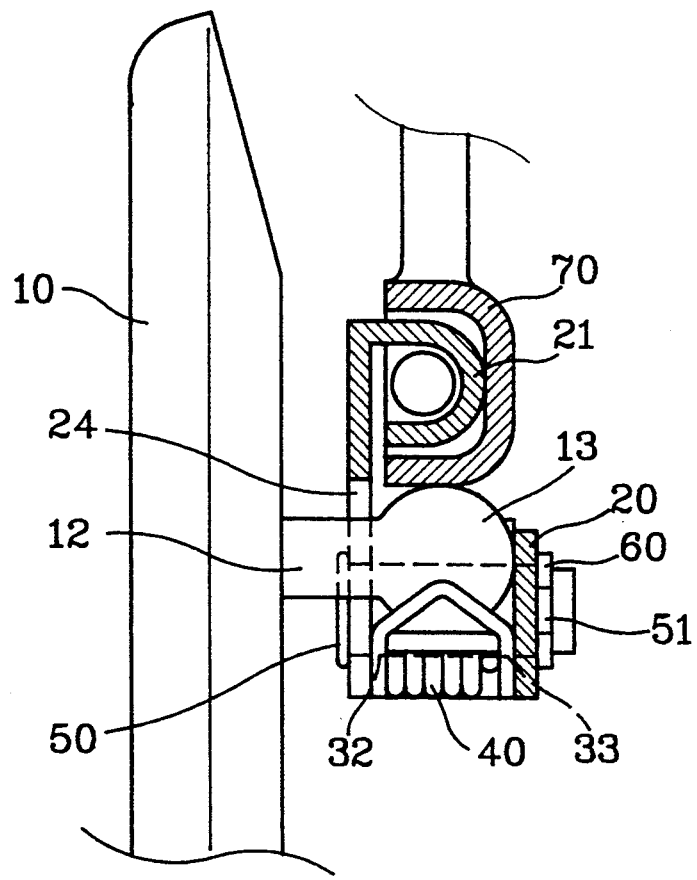
FIG. 7 is a side view of a spectacles nose piece of the previous invention.

Comparing with the previous invention illustrated in FIG. 7, the present invention has the following advantages.

1. Flat top surface 150 of protruding ball 130 keep steady contact with seat 700 due to larger contact area and the applied pressure of torsional spring 400 and pressing detent 300, making assembly and disposing of screw 800 more easily. Also making protruding ball 13 to be held more securely in base 200, and allows wearer to adjust the nose piece more effectively to fit wearer's face profile and nose bridge, also to make focus of spectacles more easily.
2. A reinforcing flange is formed above hole 220, and between hole 220 and opening 240 on base 200 to provide additional structural strength and to reduce the risk of deformation of base frame.
3. Only one hole 320 is formed on pressing detent 300, making machining and assembly more easily.
4. An opening 340 is formed on pressing detent cover 330 to engage with latching axle 500, making assembly more easily.
5. Latching axle 500 holds various components together firmly by means of stamping a hollow end flat, making production and assembly more easily and economically The present invention further contemplates the following features and advantages in the structure set forth above;

1. The concave bottom surface 140 of protruding ball 130 and the matching top pressing arm 310 of pressing detent 300 can be made in other forms such as flat surface, slant surface or curved surface to achieve same effect as concave surface.
2. The flat top surface 150 of protruding ball 130 and the flat contact of seat 700 can be made in other forms such as concave surface, slant surface or curved surface to achieve same effect as flat surface.
3. The engagement of latch opening 370 of pressing detent 300 and latching flange 380 of pressing detent cover can be made by an alternative means such as adhesive bonding.

In summary, the structure set forth above provides the following functions:

1. Comfortable wearing and less pressure.

By means of using soft plastic material and torsional spring to absorb external pressure that might apply on nose piece.

2. Automatic adjustment to fit nose bridge.

The nose piece is pivotly mounted on a protruding ball, thus can be smoothly adjusted to fit wearer's face and nose profiles.

3. Not slippery and stabilize focus

The oval and concave surface of the nose piece, the fine down planted on the surface and the applied pressure from torsional spring enable the nose piece be held securely on nose bridge of a wearer, thus facilitating focus steadiness.

4. Enhance safety

When external pressure or impact applied, pressing detent, torsional spring and connecting axle can absorb much of the impact force to minimize the injury possibility to wearer.

5. Air permeability

The permeable through holes on nose piece allow air and vapor ventilation, further enhancing wearer's comfort.

6. Easy assembly

The provision of flat top surface and concave bottom surface on protruding ball making assembly and installation much easier.

It may thus been, seen that the objects of the present invention set forth herein, as well as those made apparent from the foregoing description, are efficiently attained. While the preferred embodiment of the invention has been set forth for purpose of disclosure, modifications of the disclosed embodiment of the invention as well as other embodiment thereof may occur to those skilled in the art. Accordingly, the specific scope of the present invention is defined only by the following claims which are further exemplary of the present invention.

What is claimed is:

1. An improved structure for nose piece of spectacles to engage with a seat of spectacles comprising:

a nose piece being made of soft plastic and having a concave front surface, said front surface being disposed with fine down and having a plurality of air permeable through holes formed therein said nose piece further having an integrated connecting axle extended from a rear surface, said connecting axle having a protruding ball disposed at one end, said protruding ball having a flat top surface being contact with a bottom surface of the seat and having a concave bottom surface;

a base having a protruded P shape head and a hollow lower section formed in n shape crossection, said P shape head engages with the seat on the spectacles, said lower section having two holes formed on a left and a right sidewall respectively, the left sidewall further having an opening allowing said connecting axle and said protruding ball to pass through and allowing said protruding ball be pivotally held in said base;

a pressing detent having a protrudent top pressing arm matching with the concave bottom surface of said protruding ball, having a hole formed on a front wall and being coaxially aligned with the two holes on said base, and further having a concave latch opening formed on a rear wall, said pressing detent is disposed in said base;

a pressing detent cover having a J shape rear wall, having an opening formed at one end, and further having a protrudent latching flange to engage with the latch opening on said pressing detent, said pressing detent cover is disposed in said base and having the opening coaxially aligned with the hole on said pressing detent;

a torsional spring having two spring legs and is disposed in said base, the two spring legs being held respectively on the top pressing arm of said pressing detent and on an inside wall of said base; and a latching axle having a cavity formed at one end, said latching axle runs through the two holes on the sidewalls of said base, the hole on the front wall on said pressing detent, the opening on said pressing detent cover and said torsional spring, the cavity is stamped flat to fix on said base.

2. An improved structure for nose pieces of spectacles of claim 1 wherein contact between the bottom surface of said protruding ball and the top pressing arm of said pressing detent is flat surface, slant surface or curved surface.

3. An improved structure for nose pieces of spectacles of claim 1 wherein contact between the top surface of said protruding ball and the bottom surface of the seat is concave surface, slant surface or curved surface.

4. An improved structure for nose pieces of spectacles of claim 1 wherein engagement between the protruding latching flange of said pressing detent cover and the latch opening of said pressing detent is a snap-fit lock or point-welding.

5. An improved structure for nose pieces of spectacles of claim 1 wherein said nose pieces being made by air permeable materials.

* * * * *